US012695876B2

(12) United States Patent
Lin et al.

(10) Patent No.: US 12,695,876 B2
(45) Date of Patent: Jul. 28, 2026

(54) SIGNALING OF DOWN-SAMPLING INFORMATION FOR VIDEO BITSTREAMS

(71) Applicants:Beijing Bytedance Network Technology Co., Ltd., Beijing (CN); Bytedance Inc., Los Angeles, CA (US)

(72) Inventors: Chaoyi Lin, Beijing (CN); Yue Li, San Diego, CA (US); Kai Zhang, San Diego, CA (US); Li Zhang, San Diego, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 233 days.

(21) Appl. No.: 18/414,665

(22) Filed: Jan. 17, 2024

(65) Prior Publication Data

US 2024/0236327 A1 Jul. 11, 2024

Related U.S. Application Data

(63) Continuation of application No. PCT/CN2022/105480, filed on Jul. 13, 2022.

(30) Foreign Application Priority Data

Jul. 17, 2021 (WO) ................ PCT/CN2021/106960

(51) Int. Cl.
*H04N 19/132* (2014.01)
*H04N 19/117* (2014.01)
(Continued)

(52) U.S. Cl.
CPC ......... *H04N 19/132* (2014.11); *H04N 19/117* (2014.11); *H04N 19/186* (2014.11);
(Continued)

(58) Field of Classification Search
CPC .. H04N 19/132; H04N 19/117; H04N 19/186; H04N 19/42; H04N 19/70; H04N 19/80
See application file for complete search history.

(56) References Cited

U.S. PATENT DOCUMENTS

2013/0271566 A1* 10/2013 Chen .................... H04N 19/176
348/43
2014/0044161 A1 2/2014 Chen
(Continued)

FOREIGN PATENT DOCUMENTS

| CN | 102365869 A | 2/2012 |
| CN | 105517671 A | 4/2016 |
| CN | 107211128 A | 9/2017 |

OTHER PUBLICATIONS

Document: JVET-S2001-vH, Bross, B., et al., "Versatile Video Coding (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, 548 pages.
(Continued)

*Primary Examiner* — Jae N Noh
(74) *Attorney, Agent, or Firm* — Conley Rose, P.C.

(57) ABSTRACT

A video processing method includes determining information included in a bitstream that indicates whether down-sampling is performed on a video unit, and performing a conversion between the video unit and the bitstream based on the bitstream.

20 Claims, 9 Drawing Sheets

(51) Int. Cl.

| | | |
|---|---|---|
| *H04N 19/186* | (2014.01) | |
| *H04N 19/42* | (2014.01) | |
| *H04N 19/70* | (2014.01) | |
| *H04N 19/80* | (2014.01) | |

(52) U.S. Cl.

CPC ............. *H04N 19/42* (2014.11); *H04N 19/70* (2014.11); *H04N 19/80* (2014.11)

(56) References Cited

U.S. PATENT DOCUMENTS

| | | | |
|---|---|---|---|
| 2014/0086319 A1 | 3/2014 | Xu | |
| 2018/0332265 A1* | 11/2018 | Hwang | .............. H04N 21/8451 |
| 2023/0025503 A1* | 1/2023 | Xiu | ...................... H04N 19/186 |

OTHER PUBLICATIONS

Document: JVET-Q2002-v3, , Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.

Retrieved from the internet: https://vcgit.hhi.fraunhofer.de/jvet/VVCSoftware_VTM.git, VTM software, Apr. 10, 2024, 3 pages.

Lin, J., et al., "Convolutional Neural Network-Based Block Up-Sampling for HEVC", IEEE Transactions on Circuits and Systems for Video Technology, 2018, 15 pages.

"Series H: Audiovisual and multimedia systems Infrastructure of audiovisual services—Coding of moving video High efficiency video coding," Rec. ITU-T H.265 | ISO/IEC 23008-2 (in force edition), Recommendation ITU-T H.265 (V9), Sep. 2023, 718 pages.

Document: JVET-G1001-v1, Chen, J., et al., "Algorithm description of Joint Exploration Test Model 7 (JEM7)," Joint Video Exploration Team (JVET) of ITU-T SG 16 WP 3 and ISO/IEC JTC 1/SC 29/WVG 11 7th Meeting: Torino, IT, Jul. 13- 21, 2017, 50 pages.

Document: JVET-R2001-vB, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 530 pages.

Document: JVET-S0152-v6, Wang, Y.K., et al., "AHG2: Editorial input of a text integration for the May 2020 HLS AHG meeting outcome," Joint Video Experts Team (JVET) of ITU-T SG 16 WP 3 and ISO/IEC JTC 1/SC 29/WG 11 19th Meeting: by teleconference, Jun. 22-Jul. 1, 2020, 5 pages.

International Search Report from PCT Application No. PCT/CN2022/105480 dated Sep. 27, 2022, 9 pages.

* cited by examiner

223

400

402

410

500

600

602

Determine information included in a bitstream that indicates whether down-sampling is performed on a video unit

604

Perform a conversion between the video unit and the bitstream based on the bitstream

SIGNALING OF DOWN-SAMPLING INFORMATION FOR VIDEO BITSTREAMS

CROSS-REFERENCE TO RELATED APPLICATIONS

This application is a continuation of International Patent Application No. PCT/CN2022/105480, filed on Jul. 13, 2022, which claims the priority to and benefits of International Patent Application No. PCT/CN2021/106960, filed on Jul. 17, 2021. All the aforementioned patent applications are hereby incorporated by reference in their entireties.

TECHNICAL FIELD

The present disclosure relates to generation, storage, and consumption of digital audio and video media information in a file format.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a video processing method, comprising determining information included in a bitstream that indicates whether down-sampling is performed on a video unit, and performing a conversion between the video unit and the bitstream based on the bitstream.

Optionally, in any of the preceding aspects, another implementation of the aspect provides that the information indicates a method of down-sampling.

Optionally, in any of the preceding aspects, another implementation of the aspect provides that the information in the bitstream excludes data regarding whether to perform down-sampling on the video unit, excludes data regarding a method of down-sampling, and excludes data regarding a re-sampling ratio.

Optionally, in any of the preceding aspects, another implementation of the aspect provides that the information is carried in a supplemental enhancement information (SEI) message associated with the video unit in the bitstream.

Optionally, in any of the preceding aspects, another implementation of the aspect provides that the information is associated with a sequence, and wherein the SEI message comprising the information is positioned in the bitstream before a sequence parameter set (SPS) or a sequence header of the sequence.

Optionally, in any of the preceding aspects, another implementation of the aspect provides that the information is associated with a picture, and wherein the SEI message comprising the information is positioned in the bitstream before a picture parameter set or a picture header of the picture.

Optionally, in any of the preceding aspects, another implementation of the aspect provides that the information is associated with a slice, and wherein the SEI message comprising the information is positioned in the bitstream before a slice header of the slice.

Optionally, in any of the preceding aspects, another implementation of the aspect provides that the information is associated with a sequence, and wherein the SEI message comprising the information is positioned in the bitstream after a sequence parameter set (SPS) or a sequence header of the sequence.

Optionally, in any of the preceding aspects, another implementation of the aspect provides that the information is associated with a picture, and wherein the SEI message comprising the information is positioned in the bitstream after a picture parameter set or a picture header of the picture.

Optionally, in any of the preceding aspects, another implementation of the aspect provides that the information is associated with a slice, and wherein the SEI message comprising the information is positioned in the bitstream after a slice header of the slice.

Optionally, in any of the preceding aspects, another implementation of the aspect provides that the information in the bitstream comprises a flag indicating whether down-sampling is performed on the video unit.

Optionally, in any of the preceding aspects, another implementation of the aspect provides that the information in the bitstream comprises a re-sampling ratio indicating a ratio by which the video unit is down-sampled, and wherein down-sampling is performed on the video unit when the re-sampling ratio is greater than a threshold value.

Optionally, in any of the preceding aspects, another implementation of the aspect provides that the information in the bitstream comprises a syntax element indicating one or more methods of down-sampling performed on the video unit.

Optionally, in any of the preceding aspects, another implementation of the aspect provides that the syntax element carries at least one of a value indicating that a discrete cosine transform-based interpolation filter is used to perform down-sampling on the video unit, a value indicating that a bilinear filter is used to perform down-sampling on the video unit, or a value indicating that a bicubic filter is used to perform down-sampling on the video unit.

Optionally, in any of the preceding aspects, another implementation of the aspect provides that the syntax element carries a value indicating that a learning based down-sampling method is used to perform down-sampling on the video unit.

Optionally, in any of the preceding aspects, another implementation of the aspect provides that the learning based down-sampling method comprises at least one of a convolutional neural network (CNN)-based down-sampling method or a machine learning based down-sampling method.

Optionally, in any of the preceding aspects, another implementation of the aspect provides that the information in the bitstream comprises a flag indicating whether different down-sampling methods are applied for luma components and chroma components of the video unit.

Optionally, in any of the preceding aspects, another implementation of the aspect provides that the information in the bitstream indicates at least one of a first down-sampling method performed on luma components of the video unit and a second down-sampling method performed on chroma components of the video unit.

Optionally, in any of the preceding aspects, another implementation of the aspect provides that a first plurality of down-sampling methods for different types are slices are indicated individually in the bitstream in different syntax elements, and wherein a second plurality of down-sampling methods for different temporal layers are indicated individually in the bitstream in different syntax elements.

Optionally, in any of the preceding aspects, another implementation of the aspect provides that the information in the bitstream indicates a first method of down-sampling performed on the video unit and a second method of down-sampling performed on the video unit.

Optionally, in any of the preceding aspects, another implementation of the aspect provides that the conversion includes encoding the video unit into the bitstream.

Optionally, in any of the preceding aspects, another implementation of the aspect provides that the conversion includes decoding the bitstream to obtain the video unit.

A second aspect relates to non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

A third aspect relates to an apparatus for processing video data comprising: a processor; and a non-transitory memory with instructions thereon, wherein the instructions upon execution by the processor, cause the processor to perform the method of any of the preceding aspects.

A fourth aspect relates to a non-transitory computer-readable recording medium storing a bitstream of a video which is generated by a method performed by a video processing apparatus, wherein the method comprises determining information included in a bitstream that indicates whether down-sampling is performed on a video unit, and performing a conversion between the video unit and the bitstream based on the bitstream.

A fifth aspect relates to a method for storing bitstream of a video, comprising generating a bitstream of a video comprising a video unit, wherein the bitstream comprises an information indicating whether down-sampling is performed on the video unit, and storing the bitstream in a non-transitory computer-readable recording medium.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

4

Figure 8:
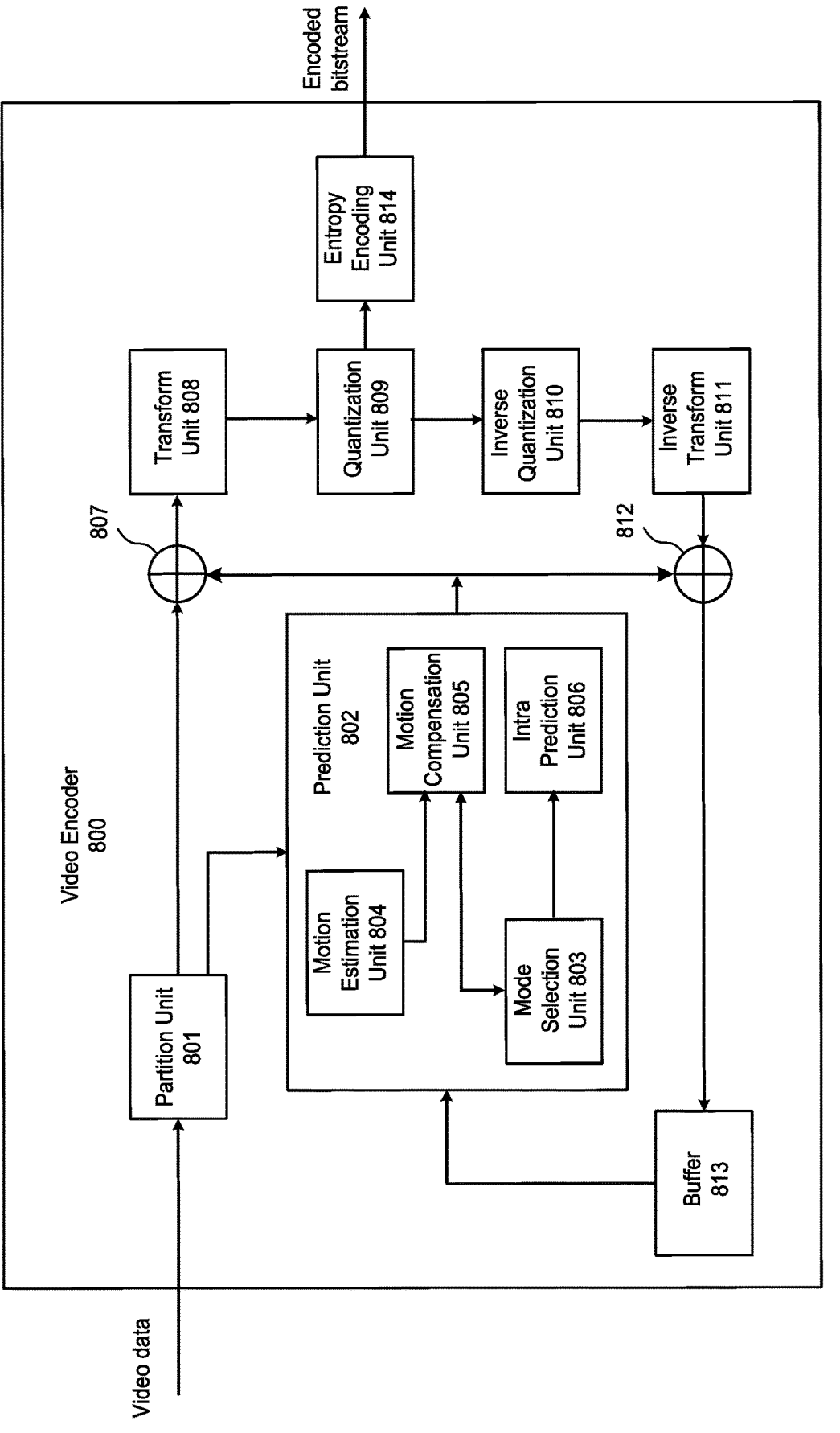

FIG. 8 is a block diagram that illustrates an example encoder.

Figure 9:
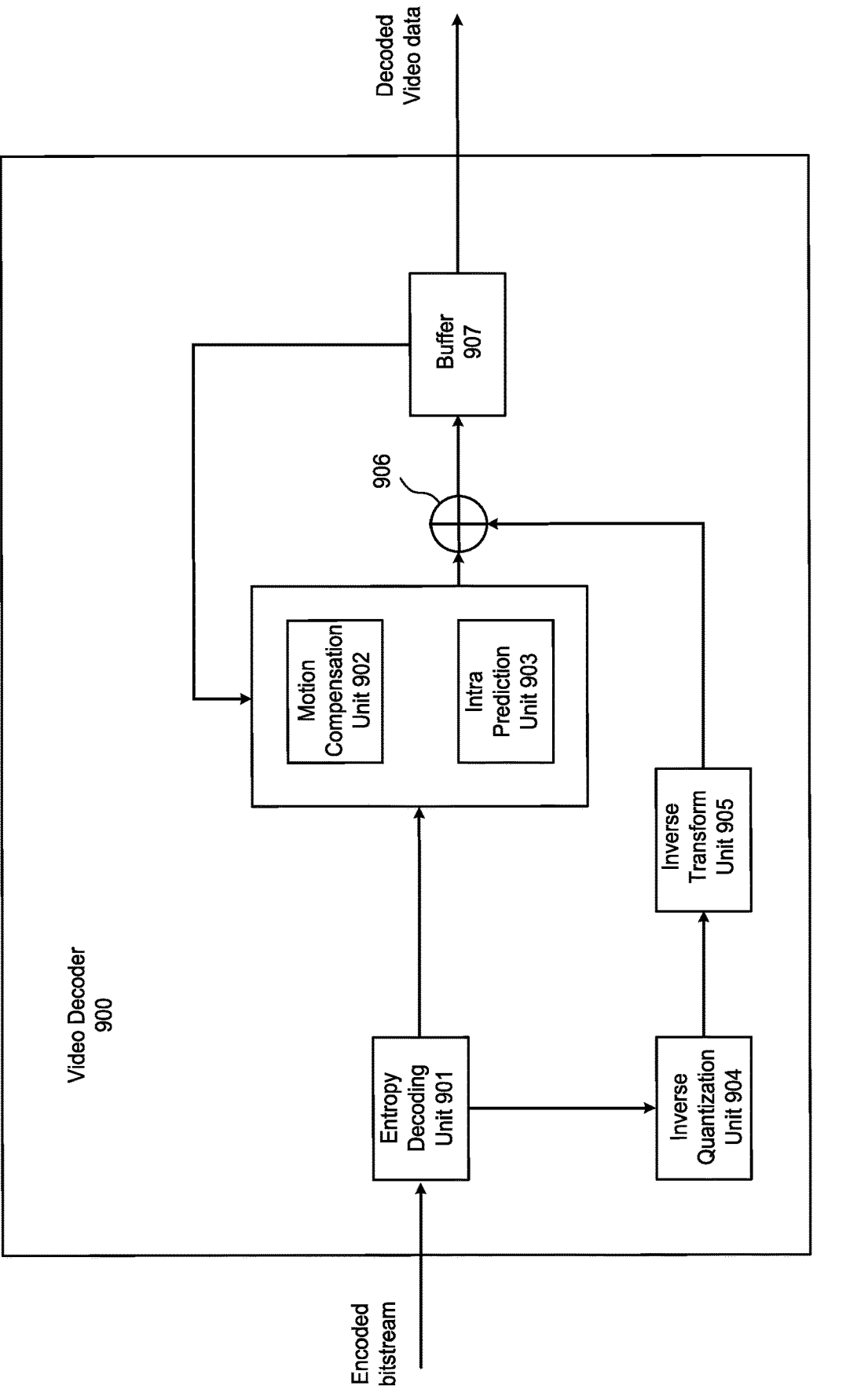

FIG. 9 is a block diagram that illustrates an example decoder.

Figure 10:
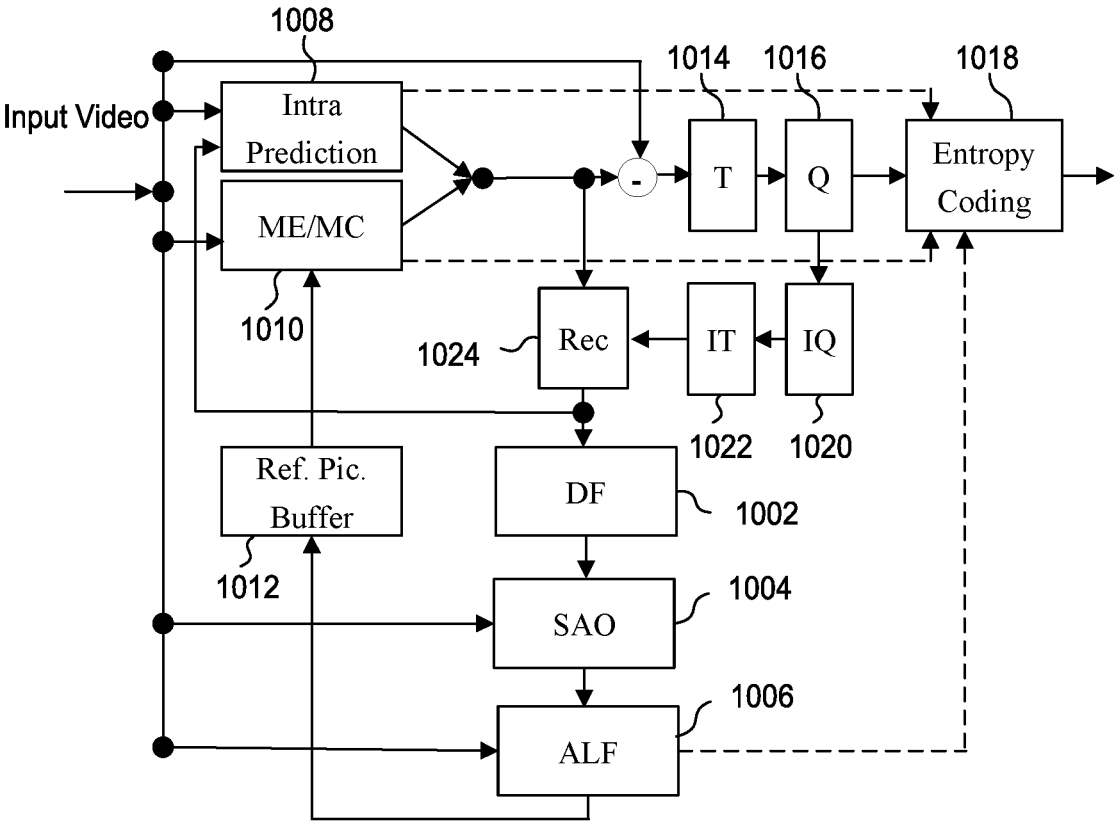

FIG. 10 is a schematic diagram of an example encoder.

DETAILED DESCRIPTION

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

The embodiments disclosed herein are related to video coding technologies. Specifically, the embodiments disclosed herein are related to signaling of down-sampling information for video bitstreams. The embodiments disclosed herein may be applied to the existing video coding standard like High Efficiency Video Coding (HEVC), or the standard Versatile Video Coding (VVC). The embodiments disclosed herein may be also applicable to future video coding standards, video codec, or being used as post-processing method, which is out of the encoding/decoding process.

Video coding standards have evolved primarily through the development of the International Telecommunication Union (ITU) Telecommunication Standardization Sector (ITU-T) and International Organization for Standardization (ISO)/International Electrotechnical Commission (IEC) standards. The ITU-T produced a H.261 standard and a H.263 standard, ISO/IEC produced Motion Picture Experts Group (MPEG) phase one (MPEG-1) and MPEG phase four (MPEG-4) Visual standards, and the two organizations jointly produced the H.262/MPEG phase two (MPEG-2) Video standard, the H.264/MPEG-4 Advanced Video Coding (AVC) standard, and the H.265/High Efficiency Video Coding (HEVC) standard. Since H.262, the video coding standards are based on a hybrid video coding structure that utilizes a temporal prediction plus a transform coding. To explore the future video coding technologies beyond HEVC, Joint Video Exploration Team (JVET) was founded in 2015. Since then, many methods have been adopted by JVET and put into the reference software named Joint Exploration Model (JEM).

Figure 1:
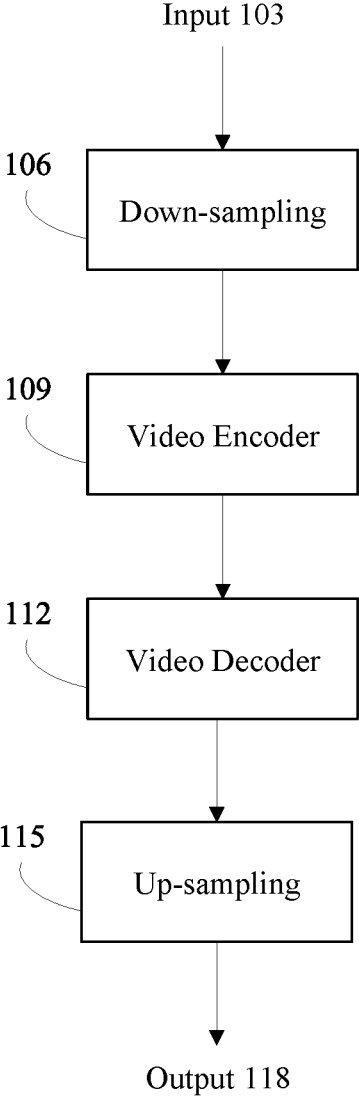
FIG. 1 is a block diagram that illustrates an example method of performing reference picture re-sampling (RPR).

FIG. 1 is a block diagram that illustrates an example method of performing reference picture re-sampling (RPR). As used herein, RPR is also referred to herein as simply re-sampling (also referred to herein as "resampling") or down-sampling (also referred to herein as "downsampling"). RPR refers to the encoding of a down-sampled sequence and then up-sampling the reconstruction after decoding. RPR is a mechanism in VVC, in which pictures in the reference lists may be stored at a different resolution from the current picture and then re-sampled in order to perform regular decoding operations.

As shown in FIG. 1, re-sampling or down-sampling may be performed on an input 103, which may be a picture, such as a reference picture for a sequence, a sub-picture, a slice, a video unit, a sequence, or other type of signal. Down-sampling 106 may be performed on the input 103 to filter the input 103 and reduce a resolution, or number of pixels, of the input 103. Various methods of down-sampling 106 may be performed on the input 103, such as, for example, a discrete cosine transform-based interpolation filter (DCTIF), bilinear filter, bicubic filter, learning-based down-sampling method, convolutional neural network (CNN)-based down-sampling, machine learning-based down-sampling method, or any other type of down-sampling 106.

For example, a processor coupled to a video encoder 109 may perform the down-sampling 106 of the input 103, and then pass the down-sampled, lower resolution version of the input 103 to the video encoder 109. The video encoder 109 may be similar to the video encoder 800 of FIG. 8 and the video encoder 1000 of FIG. 10. The video encoder 109 may further encode the input 103 according to various encoding methods described herein, and pass the down-sampled, lower resolution, encoded version of the input 103 to the video decoder 112. The video decoder 112 may be positioned at a device separate from the video encoder 109, or may be positioned in the same device as the video encoder 109. The video decoder 112 may be similar to the video decoder 900 of FIG. 9. The video decoder 112 may decode the down-sampled, lower resolution, encoded version of the input 103, for example, based on information received with the input 103, to obtain the down-sampled, lower resolution version of the input 103.

The video decoder 112 may then pass the down-sampled, lower resolution version of the input 103 to, for example, another processor coupled to the video decoder 112, to up-sample the input 103. The process of up-sampling 115 refers to the process of re-sampling the down-sampled, lower resolution version of the input 103 to obtain the original input 103. Up-sampling 115 may involve the expansion and interpolation of the down-sampled, lower resolution version of the input 103 to obtain the original input 103. Up-sampling 115 of the down-sampled, lower resolution version of the input 103 may be performed according to the same down-sampling method or technique used to down-sample the input 103, to obtain the original input 103 as the output 118. RPR supports interesting application scenarios such as real-time communication with adaptive resolution and adaptive streaming with open group of pictures (GOP) structures.

For example, up-sampling technology may be utilized for down-sampling. In VVC test model (VTM) 11.0, the down-sampling filter is DCTIF. Besides, bi-cubic interpolation and bi-linear interpolation may also be used. In these technologies, the weight coefficients for the interpolation filter may be fixed once the number of taps of filters is given. Thus, the weight coefficients of these methods may be not the most optimal.

Learning-based down-sampling methods can be trained to achieve a better down-sampling quality compared with the traditional down-sampling technology. For example, in CNN-based down-sampling method, there may be a down-sampling layer (e.g., convolution with the stride of 2) in the network structure.

In deep learning, a convolutional neural network (NN, CNN, or ConvNet) is a class of deep neural networks, which may be applied to analyzing visual imagery. CNNs have successful applications in image and video recognition/processing, recommender systems, image classification, medical image analysis, natural language processing, etc. CNNs are regularized versions of multilayer perceptrons. Multilayer perceptrons refer to fully connected networks, that is, each neuron in one layer is connected to all neurons in the next layer. The "fully-connectedness" of these networks may make them prone to overfitting data. Regularization of these networks may include adding some form of magnitude measurement of weights to the loss function.

CNNs take a different approach towards regularization by taking advantage of the hierarchical pattern in the data and assembling more complex patterns using smaller and simpler patterns. Therefore, on the scale of connectedness and complexity, CNNs are on the lower extreme. CNNs may use relatively little pre-processing compared to other image classification/processing algorithms. This means that CNN networks learn the filters that are in traditional algorithms, and this independence can be a major advantage.

Deep learning-based image/video compression may have two implications: (1) end-to-end compression based on neural networks and (2) traditional frameworks enhanced by neural networks. The first type (i.e., end-to-end compression based on neural networks) usually takes an auto-encoder like structure, either achieved by CNNs or recurrent neural networks. While purely relying on neural networks for image/video compression can avoid any manual optimizations or hand-crafted designs, compression efficiency may be not satisfactory. Therefore, works distributed in the second type (i.e., traditional frameworks enhanced by neural networks) take neural networks as an auxiliary, and enhance traditional compression frameworks by replacing or enhancing some modules. In this way, the second type can inherit the merits of the highly optimized traditional frameworks.

In lossy image/video compression, the reconstructed frame may be an approximation of the original frame, since the quantization process is not invertible and thus, incurs distortion to the reconstructed frame. In the context of RPR, the input image/video may be down-sampled. Thus, the resolution of original frame is 2 times (i.e., 2×) of that of reconstruction. To up-sample the low-resolution reconstruction, a CNN may be trained to learn the mapping from the distorted low-resolution frame to the original high-resolution frame. For example, training may be performed prior to deploying the NN-based in-loop filtering. For example, a CNN based block up-sampling method for HEVC includes, for each coding tree unit (CTU) block, a determination as to whether to use a down/up-sampling based method or the full-resolution based coding.

The purpose of the training processing may be to find the optimal value of parameters including weights and bias. First, a codec (e.g., HM, JEM, VTM, etc.) may be used to compress the training dataset to generate the distorted reconstruction frames. Then, the reconstructed frames (low-resolution and compressed) may be fed into the NN, and the cost may be calculated using the output of NN and the ground-truth frames (original frames). Some cost functions include sum of absolution difference (SAD) and mean square error (MSE). Next, the gradient of the cost with respect to each parameter may be derived through the back-propagation algorithm. With the gradients, the values of the parameters can also be updated. The above process repeats until the convergence criteria is met. After completing the training, the derived optimal parameters are saved for use in the inference stage.

During convolution, the filter may be moved across the image from left to right, and/or top to bottom, with a one-pixel column change on the horizontal movements, then a one-pixel row change on the vertical movements. The amount of movement between applications of the filter to the input image is referred to as the stride, and may be symmetrical in height and width dimensions. For example, the default stride or strides in two dimensions may be (1,1) for the height and the width movement. In deep CNN, residual blocks are utilized as the basic module and stacked several times to construct the final network. In one example, the residual block is obtained by combining a convolutional layer, a Rectified Linear Activation Function (ReLU)/Parametric ReLU (PReLU) activation function, and a convolutional layer.

During the inference stage, the distorted reconstruction frames are fed into the NN and processed by the NN model having parameters that may have already been determined in the training stage. The input samples to the NN can be reconstructed samples before or after deblocking filter (DB), or reconstructed samples before or after sample adaptive offset (SAO), or reconstructed samples before or after adaptive loop filter (ALF).

Video Usability Information (VUI) is a syntax structure sent as part of the sequence parameter set (SPS) (and possibly also in video parameter set (VPS) in HEVC). VUI may carry information that does not affect the normative decoding process, but that can be important for proper rendering of the coded video.

Supplemental enhancement information (SEI) assists in processes related to decoding, display or other purposes. Similar to VUI, SEI does not affect the normative decoding process, either. SEI is carried in SEI messages. Decoder support of SEI messages may be optional. However, SEI messages do affect bitstream conformance (e.g., if the syntax of a SEI message in a bitstream does not follow the specification, then the bitstream is not conforming). Some SEI messages may be needed in the Hypothetical Reference Decoder (HRD) specification.

The VUI syntax structure and most SEI messages used with VVC may not be specified in the VVC specification, but rather in the Versatile Supplemental Enhancement Information Messages for Coded Video Bitstreams (VSEI) specification. The SEI messages used for HRD conformance testing may be specified in the VVC specification. For example, version 1 of the VVC specification defines five SEI messages relevant for HRD conformance testing and version 1 of the VSEI specification specifies 20 additional SEI messages. The SEI messages carried in the VSEI specification may not directly impact conforming decoder behavior and may have been defined to be used in a coding-format-agnostic manner, allowing VSEI to be used in the future with other video coding standards in addition to VVC. Rather than referring specifically to VVC syntax element names, the VSEI specification refers to variables, with values that are set within the VVC specification.

Compared to HEVC, the VUI syntax structure of VVC may focus only on information relevant for proper rendering of the pictures and may not contain any timing information or bitstream restriction indications. In VVC, the VUI is signaled within the SPS, which includes a length field before the VUI syntax structure to signal the length of the VUI payload in bytes. This makes it possible for a decoder to easily jump over the information, and may allow convenient future VUI syntax extensions by directly adding new syntax elements to the end of the VUI syntax structure, in a manner similar to SEI message syntax extension.

The VUI syntax structure contains the following information: (1) the content being interlaced or progressive, (2) whether the content contains frame-packed stereoscopic video or projected omnidirectional video, (3) sample aspect ratio, (4) whether the content is appropriate for over scan display, (5) color description, including color primaries, matrix and transfer characteristics, which may be particularly important to be able to signal ultra-high definition (UHD) vs high definition (HD) color space as well as high dynamic range (HDR), (6) chroma location compared to luma (for which the signaling may be clarified for progressive content compared to HEVC), etc. When the SPS does not contain any VUI, the information may be considered unspecified, such that the information may be conveyed via external means or specified by the application if the content of the bitstream is intended for rendering on a display.

Table 1 lists some of the SEI messages specified for version 1 of VVC, as well as the specification containing the respective syntax and semantics. Of the 20 SEI messages specified in the VSEI specification, many may have been inherited from HEVC (for example, the filler payload and both user data SEI messages). Some SEI messages may be essential for correct processing or rendering of the coded video content. This is for example the case for the mastering display color volume, the content light level information, or the alternative transfer characteristics SEI messages, which are particularly relevant for HDR content. Other examples include the equirectangular projection, sphere rotation, region-wise packing, or omnidirectional viewport SEI messages, which are relevant for signaling and processing of 360 degrees (°) video content.

TABLE 1

| Name of SEI message | Purpose of SEI message |
|---|---|
| SEI messages specified in the VVC specification | |
| Buffering period | Initial CPB removal delays for HRD |
| Picture timing | CPB removal delays and DPB output delays for HRD |
| Decoding unit information | CPB removal delays and DPB output delays for DU based HRD |
| Scalable nesting | Mechanism to associate SEI messages with specific output layer sets, layers or sets of subpictures |
| Subpicture level information | Information about levels for subpicture sequences |
| SEI messages specified in the VSEI specification | |
| Filler payload | Filler data for adjusting the bit rate |
| User data registered by Rec. ITU-T T.35 | Convey user data, can be used as container for data by other organizations |
| User data unregistered | |
| Film grain characteristics | Model for film grain synthesis |
| Frame packing arrangement | Information about how stereoscopic video is coded in the bitstream, e.g., by packing the two pictures for each time instance of the two views into one picture |

TABLE 1-continued

| Name of SEI message | Purpose of SEI message |
|---|---|
| Parameter sets inclusion indication | Indication of whether the sequence contains all the required NAL units for decoding |
| Decoded picture hash | Hash of the decoded pictures for error detection |
| Mastering display color volume | Description of the color volume of a display used to author the content |
| Content light level information | Upper bounds for the nominal target brightness light level of the content |
| Dependent RAP indication | Indicates a picture using only the preceding IRAP picture for inter prediction referencing |
| Alternative transfer characteristics | Preferred alternative value for the transfer characteristics of the content |
| Ambient viewing environment | Characteristics of the nominal ambient viewing environment for the display of the content, can be used to assist the receiver in processing content depending on the local viewing environment |
| Content color volume | Color volume characteristics of the associated picture |
| Equirectangular projection | Indication of the projection format applied, including information needed for remapping of the content onto a sphere |
| Generalized cubemap projection | for rendering in omnidirectional video applications |
| Sphere rotation | Information on rotation angles for conversion between the global and local coordinate axes, for use in omnidirectional video applications |
| Region-wise packing | Information needed for remapping of the cropped decoded pictures, involving region-wise operations like repositioning, resizing and rotation, onto projected pictures, for use in omnidirectional video applications |
| Omnidirectional viewport | Coordinates of one or more regions corresponding to viewports recommended for display, for use in omnidirectional video applications |
| Frame-field information | Indicates how the associated picture should be displayed, its source scan, and whether it is a duplicate of a previous picture |
| Sample aspect ratio information | Information about sample aspect ratio of the associated picture |

SEI messages supported by VVC may include the frame-field information SEI message, the sample aspect ratio information SEI message, and the subpicture level information SEI message. The frame-field information SEI message may include information to indicate how the associated picture should be displayed (such as field parity or frame repetition period), the source scan type of the associated picture, and whether the associated picture is a duplicate of a previous picture. This information may be signaled in the picture timing SEI message in previous video coding standards, together with the timing information of the associated picture. However, the frame-field information and timing information are two different kinds of information that may not necessarily be signaled together. For example, in signaling the timing information at the systems level, the frame-field information is signaled within the bitstream. The frame-field information may then be then removed from the picture timing SEI message, and instead signaled within a dedicated SEI message. This also made it possible to modify the syntax of the frame-field information to convey additional and clearer instructions to the display, such as the pairing of fields together, or more values for frame repetition.

In some cases, the sample-aspect ratio SEI message may enable signaling different sample aspect ratios for different pictures within the same sequence, while the corresponding information contained in the VUI applies to the whole sequence. This may be relevant when using the reference picture re-sampling features with scaling factors that cause different pictures of the same sequence to have different sample aspect ratios. The subpicture level information SEI message may provide information of levels for the subpicture sequences.

Figure 2:
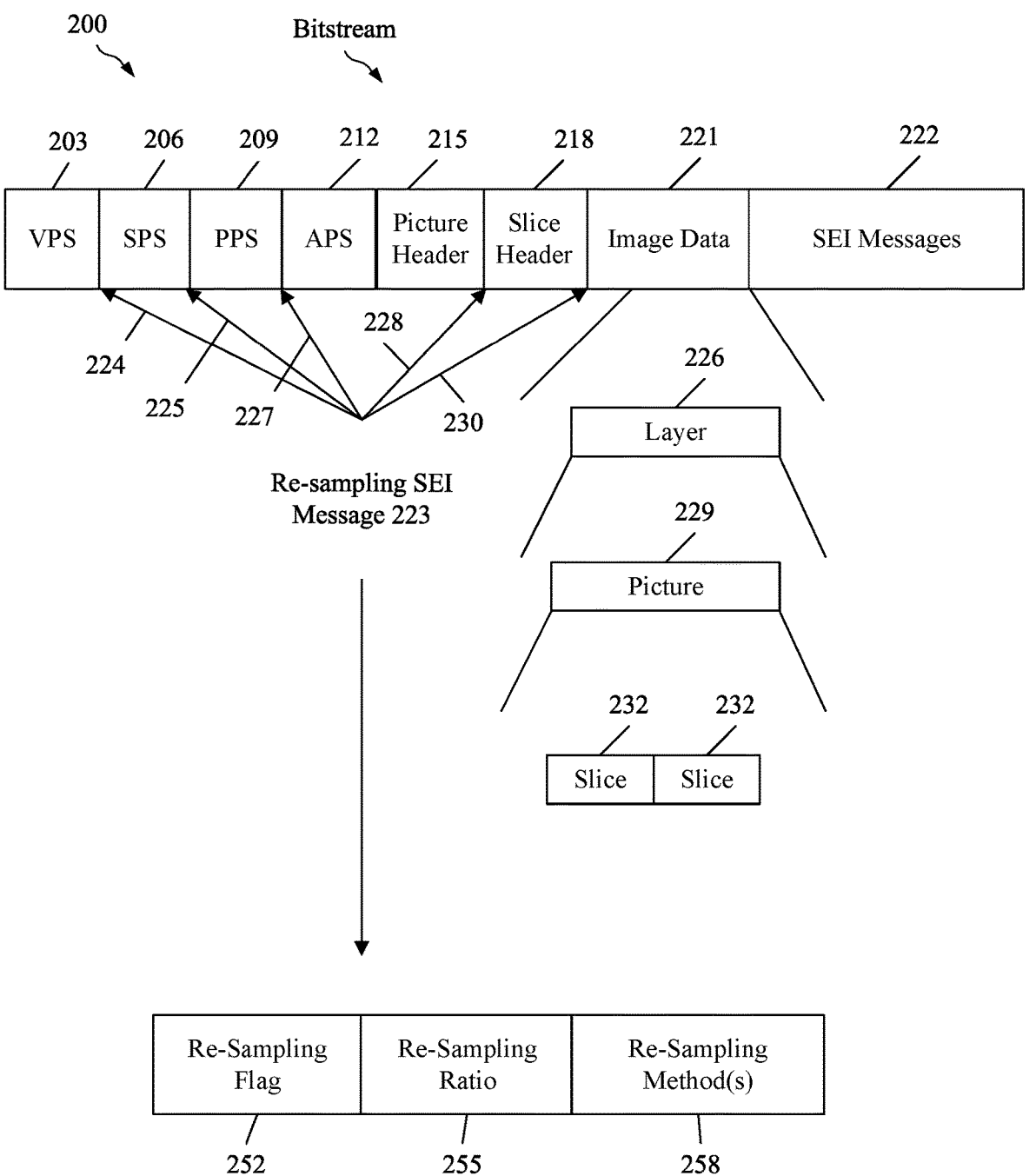
FIG. 2 is a schematic diagram illustrating an example bitstream.

FIG. 2 is a schematic diagram illustrating an example bitstream 200. For example, the bitstream 200 can be generated by a video encoder 109 of FIG. 1, video encoder 800 of FIG. 8, or video encoder 1000 of FIG. 10, for decoding by a video decoder 112 of FIG. 1 or video decoder 900 of FIG. 9. Further, the bitstream 200 may include a multi-layer video sequence. The bitstream 200 includes a video parameter set (VPS) 203, one or more sequence parameter sets (SPSs) 206, a plurality of picture parameter sets (PPSs) 209, a plurality of adaptation parameter sets (APSs) 212, a plurality of picture headers 215, a plurality of slice headers 218, image data 221, and SEI messages 222. A VPS 203 contains data related to the entire bitstream 200. An SPS 206 contains sequence data common to all pictures in a coded video sequence contained in the bitstream 200. For example, each layer may contain one or more coded video sequences, and each coded video sequence may reference an SPS 206 for corresponding parameters. The parameters in an SPS 206 can include picture sizing, bit depth, coding tool parameters, bit rate restrictions, etc. It should be noted that, while each sequence refers to an SPS 206, a single SPS 206 can contain data for multiple sequences in some examples. The PPS 209 contains parameters that apply to an entire picture. Hence, each picture in the video sequence may refer to a PPS 209. It should be noted that, while each picture refers to a PPS 209, a single PPS 209 can contain data for multiple pictures in some examples. For example, multiple similar pictures may be coded according to similar parameters. In such a case, a single PPS 209 may contain data for such similar pictures. The PPS 209 can indicate coding tools available for slices in corresponding pictures, quantization parameters, offsets, etc. PPS 209 may be related to a particular set of pictures 229 and the bitstream 200 may include many PPSs 209. As such, each PPS 209 may include a PPS ID that identifies the PPS 209 for reference by other syntax elements.

An APS 212 is syntax structure containing syntax elements/parameters that apply to one or more slices 232 in one or more pictures 229. Such correlations can be determined based on syntax elements found in slice headers 218 associated with the slices 232. For example, an APS 212 may apply to at least one, but less than all, slices 232 in a first picture 229, to at least one, but less than all, slices 232 in a second picture 229, etc. An APS 212 can be separated into multiple types based on the parameters contained in the APS 212. Such types may include adaptive loop filter (ALF) APS, luma mapping with chroma scaling (LMCS) APS, and scaling list APS.

A picture header 215 is a syntax structure containing syntax elements that apply to all slices 232 of a coded picture 229. For example, a picture header 215 may contain picture order count information, reference picture data, data relating in intra-random access point (IRAP) pictures, data related to filter application for a picture 229, etc. A picture unit (PU) may contain exactly one picture header 215 and exactly one picture 229. As such, the bitstream 200 may include exactly one picture header 215 per picture 229. The picture header 215 may also specify the PPS ID that indicates which PPS 209 contains parameters related to the picture 229 that corresponds to the picture header 215.

A slice header 218 contains parameters that are specific to each slice 232 in a picture 229. Hence, there may be one slice header 218 per slice 232 in the video sequence. The slice header 218 may contain slice type information, filtering information, prediction weights, tile entry points, deblocking parameters, etc. In some instances, syntax elements may be the same for all slices 232 in a picture 229. In order to reduce redundancy, the picture header 215 and slice header 218 may share certain types of information. For example, certain parameters (e.g., filtering parameters) may be included in the picture header 215 when they apply to an entire picture 229 or included in a slice header 218 when they apply to a group of slices 232 that are a subset of the entire picture 229.

The image data 221 contains video data encoded according to inter-prediction and/or intra-prediction as well as corresponding transformed and quantized residual data. For example, the image data 221 may include layers 226, pictures 229, and/or slices 232. A layer 226 is a set of video coding layer (VCL) network abstraction layer (NAL) units that share a specified characteristic (e.g., a common resolution, frame rate, image size, etc.) as indicated by a layer ID and associated non-VCL NAL units. For example, a layer 226 may include a set of pictures 229 that share the same layer ID. A layer 226 is a group of pictures that are all associated with a similar value of a characteristic, such as a similar size, quality, resolution, signal to noise ratio, capability, etc. A layer may be defined formally as a set of VCL NAL units that share the same layer ID and associated non-VCL NAL units. A VCL NAL unit is a NAL unit coded to contain video data, such as a coded slice of a picture. A non-VCL NAL unit is a NAL unit that contains non-video data such as syntax and/or parameters that support decoding the video data, performance of conformance checking, or other operations. A bitstream 200 can be coded as a sequence of NAL units. A NAL unit is a container for video data and/or supporting syntax.

A picture 229 is an array of luma samples and/or an array of chroma samples that create a frame or a field thereof. For example, a picture 229 is a coded image that may be output for display or used to support coding of other picture(s) 226 for output. A picture 229 contains one or more slices 232. A slice 232 may be defined as an integer number of complete tiles or an integer number of consecutive complete CTU rows (e.g., within a tile) of a picture 229 that are exclusively contained in a single NAL unit. The slices 232 are further divided into CTUs and/or coding tree blocks (CTBs). A CTU is a group of samples of a predefined size that can be partitioned by a coding tree. A CTB is a subset of a CTU and contains luma components or chroma components of the CTU. The CTUs/CTBs are further divided into coding blocks based on coding trees. The coding blocks can then be encoded/decoded according to prediction mechanisms.

SEI messages 222 is a syntax structure with specified semantics that conveys information that is not needed by the decoding process in order to determine the values of the samples in decoded pictures. For example, the SEI messages 222 may contain data that is not directly relevant to decoding the bitstream 200 at a decoder. As further described herein, the SEI messages 222 may not necessarily need to be positioned after the image 221, but may be positioned anywhere within the bitstream 200.

As noted above, pictures 229 in different layers 226 have different characteristics. For example, pictures 229 in different layers 226 can be encoded at different sizes, resolutions, frame rates, etc. This allows an encoder to transmit different layers 226 to a decoder depending on decoder side constraints. In order to perform this function, an encoder can encode all of the layers 226 into a single bitstream 200. Upon request, the encoder (or a slicer at a content hosting server) can perform a sub-bitstream extraction process to remove extraneous information from the bitstream 200 prior to transmission. The result is an extracted bitstream 200 that contains only the data to decode the requested layer(s) 226. This process can be accomplished by employing the NAL units.

However, the bitstream 200 does not indicate whether a compressed picture or video has been down-sampled. Similarly, the bitstream 200 does not indicate a down-sampling ratio applied to a picture or video when down-sampling has been applied. The bitstream 200 also does not indicate a method of down-sampling applied to a picture or video. Therefore, the receiving side video decoder has no way of determining whether the compressed picture or video is down-sampled based on the information in the bitstream 200. In addition, the receiving side video decoder cannot determine the down-sampling ratio applied to the picture or video, when down-sampling has been applied, based on the information in the bitstream 200. Lastly, the receiving side video decoder cannot determine the actual down-sampling method performed on the picture or video based on the information in the bitstream 200, meaning that the video decoder cannot accurately and efficiently up-sample the picture or video based on the bitstream 200. While it may be possible for the video decoder to select a best method of up-sampling for the image or video sequence, this may only be taken advantage of when the video decoder is capable of performing various different methods of up-scaling. In this case, selecting the best model of up-sampling may sometimes be beneficial to the quality of up-sampled reconstruction of the image or video stream. However, in general, the receiving side video decoder does not have enough information, for example, in the bitstream 200, to accurately and efficiently perform up-sampling, interpolation, and reconstruction on the picture or video.

Disclosed herein are embodiments directed to enhancing the bitstream 200 to include syntax elements, SEI messages 222, and/or flags directed to signaling, in the bitstream 200, information indicating whether and how re-sampling or down-sampling is performed on a video unit with a higher resolution to obtain a down-sampled video unit with a lower resolution. The term "video unit" may refer to a sequence, picture, sub-picture, video, or slice. In an embodiment, the bitstream 200 may further include a re-sampling SEI message 223, which is similar to the SEI messages 222 in that the re-sampling SEI message 223 is a syntax structure with specified semantics that conveys information that may not be needed by the decoding process in order to determine the values of the samples in decoded pictures. However, the re-sampling SEI message 223 may be specifically encoded to include the information indicating whether and how re-sampling or down-sampling is performed on a video unit with a higher resolution to obtain a down-sampled video unit with a lower resolution.

In an embodiment, the re-sampling SEI message 223 may be followed by a representation of the video unit or may follow a representation of the video unit. For example, when the re-sampling SEI message 223 includes information indicating whether and how re-sampling or down-sampling is performed on a sequence, the re-sampling SEI message 223 may be positioned within the bitstream 200 relative to the SPS 206, as shown by arrows 224 and 225. For example, the re-sampling SEI message 223 may be followed by the SPS 206 or a sequence header of the sequence (i.e., positioned within the bitstream 200 before the SPS 206 or a sequence header of the sequence), as shown by arrow 224. Alternatively, the re-sampling SEI message 223 may follow the SPS 206 or a sequence header of the sequence (i.e., positioned within the bitstream 200 after the SPS 206 or a sequence header of the sequence), as shown by arrow 225.

As another example, when the re-sampling SEI message 223 includes information indicating whether and how re-sampling or down-sampling is performed on a picture, the re-sampling SEI message 223 may be positioned within the bitstream 200 relative to the PPS 209, as shown by arrows 225 and 227. For example, the re-sampling SEI message 223 may be followed by the PPS 209 or a picture header of the picture (i.e., positioned within the bitstream 200 before the PPS 209 or a picture header of the picture), as shown by arrow 225. Alternatively, the re-sampling SEI message 223 may follow the PPS 209 or a picture header of the picture (i.e., positioned within the bitstream 200 after the PPS 209 or a picture header of the picture), as shown by arrow 227.

As yet another example, when the re-sampling SEI message 223 includes information indicating whether and how re-sampling or down-sampling is performed on a slice, the re-sampling SEI message 223 may be positioned within the bitstream 200 relative to the slice header 218, as shown by arrows 228 and 230. For example, the re-sampling SEI message 223 may be followed by the slice header 218 of the slice (i.e., positioned within the bitstream 200 before the slice header 218 of the slice), as shown by arrow 228. Alternatively, the re-sampling SEI message 223 may follow the slice header 218 of the slice (i.e., positioned within the bitstream 200 after the slice header 218 of the slice), as shown by arrow 230.

In an embodiment, the re-sampling SEI message 223 may further include a re-sampling flag 252 indicating whether the coded video unit has been re-sampled or down-sampled. For example, the re-sampling flag 252 may be a bit set to indicate whether the video unit has been re-sampled or down-sampled.

In an embodiment, the re-sampling SEI message 223 may further include a re-sampling ratio 255 indicating how the video unit has been re-sampled or down-sampled. The re-sampling ratio 255 may be indicated as a percentage or ratio by which the video unit has been re-sampled or down-sampled. For example, the re-sampling SEI message 223 includes a syntax element carrying the re-sampling ratio 255.

In an embodiment, the re-sampling SEI message 223 may further include one or more re-sampling methods 258 indicating one or more types of down-sampling or re-sampling methods. For example, the re-sampling SEI message 223 may include a syntax element carrying a value representing a down-sampling method, such as, for example, DCTIF, bilinear filter, bicubic filter, learning-based down-sampling method, CNN-based down-sampling, machine learning-based down-sampling method, or any other type of down-sampling. In an embodiment, the re-sampling SEI message 223 may indicate several different re-sampling methods 258, for example, in different syntax elements. For example, two re-sampling methods 258 may be signaled in the bitstream 200, in which the first re-sampling method 258 indicates a machine learning-based down-sampling method, and a second re-sampling method 258 is handcrafted (e.g., bilinear, bicubic, DCTIF, etc.). In an embodiment, the re-sampling methods 258 for different types of slices may be signaled in the bitstream 200 individually, for example, in different syntax elements. In an embodiment, the re-sampling methods 258 for different temporal layers 226 may also be signaled in the bitstream 200 individually, for example, in different syntax elements.

Figure 3:
FIG. 3 is a schematic diagram illustrating an example re-sampling message included in the bitstream of FIG. 2.
Figure 3:
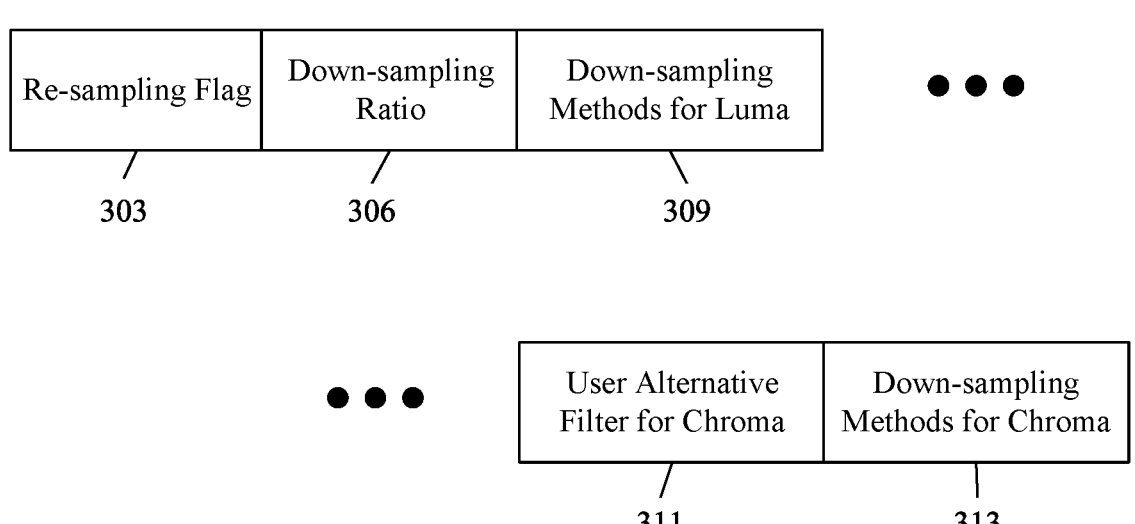

FIG. 3 is a schematic diagram illustrating an example re-sampling SEI message 223 included in the bitstream 200. The SEI message 223 shown in FIG. 3 includes a re-sampling flag 303, a down-sampling ratio 306, down-sampling methods for luma 309, a use alternative filter for chroma flag 311, and down-sampling methods for chroma 313. The re-sampling flag 303 may be a flag, similar to the re-sampling flag 252 of FIG. 2. For example, re-sampling flag 303 may be set to 1 to indicate that the compressed video unit is down-sampled, or set to 0 to indicate that the video unit is compressed at the original resolution.

The down-sampling ratio 306 may be similar to the re-sampling ratio 255 of FIG. 2, in that the down-sampling ratio 306 indicates down-sampling ratio of the compressed video unit. In an embodiment, the value of the down-sampling ratio 306 may be $2^{downsampling\_ratio+1}$.

The down-sampling methods for luma 309 may specify the down-sampling methods used on a luma component in the video unit. For example, the types of down-sampling methods for the luma component are specified below in Table 2:

TABLE 2

| Mapping of downsampling_methods_for_luma to the type of down-sampling methods | | |
| --- | --- | --- |
| value | Name | Type of down-sampling methods |
| 0 | DOWN_DCTIF | DCTIF |
| 1 | DOWN_BILINEAR | Bilinear |
| 2 | DOWN_BICUBIC | Bicubic |
| 3 | DOWN_CNN | CNN-based method |
| 4 . . . 7 | | Reserved |

For example, the down-sampling methods for luma 309 may be a syntax element carrying one or more of the values shown in Table 2, based on the down-sampling methods applied to the luma components in the video unit.

The use alternative filter for chroma flag 311 may be a flag indicating whether different down-sampling methods are applied for luma and chroma components in the video unit. For example, the use alternative filter for chroma flag 311 may be set to 1 to indicate that different down-sampling methods are applied for luma and chroma components, respectively, or set to 0 to indicate that the down-sampling method for luma components is the same as the down-sampling method for chroma components.

The down-sampling methods for chroma 313 specify the down-sampling methods used on chroma components in the video unit. For example, the types of down-sampling methods for the chroma component are specified above in Table 2. For example, the down-sampling methods for chroma 313 may be a syntax element carrying one or more of the values shown in Table 2, based on the down-sampling methods applied to the chroma components in the video unit.

Example 1

Information indicating whether and/or how a first video unit with a first resolution represented in a bitstream 200 is re-sampled (e.g., down-sampled) from a second video unit with a second resolution may be signaled in the video bitstream 200. At least one component (width or height) of the first resolution may be different from that of the second resolution. For example, at least one component (width or height) of the first resolution may be lower (or higher) than that of the second resolution.

Alternately, the whole or a part of the information may be derived at the decoder side without signaling. For example, the decoder side may determine that a video unit has been re-sampled based on whether previous video units in a sequence have been re-sampled, and how the re-sampling is performed. The video unit may be a sequence, a picture, a sub-picture, or a slice. In one example, the information associated with a video unit may be signaled for that video unit, such as in SPS/sequence header/PPS/picture header/slice header/APS/etc.

Example 2

In an embodiment, the information may be signaled in a SEI message, e.g., named re-sampling SEI message 223. In an embodiment, the SEI message including the information associated with a video unit may be followed by a representation of the video unit. For example, a SEI message including information associated with a sequence may be followed by the SPS or sequence header of the sequence. For example, a SEI message including information associated with a picture may be followed by the PPS or picture header of the picture. For example, a SEI message including the information associated with a slice may be followed by the slice header of the slice.

Example 3

In an embodiment, the SEI message including the information associated with a video unit may follow a representation of the video unit. For example, a SEI message including the information associated with a sequence may follow the SPS or sequence header of the sequence. For example, a SEI message including the information associated with a picture may follow the PPS or picture header of the picture. For example, a SEI message including the information associated with a slice may follow the slice header of the slice.

Example 4

In an embodiment, the information may include a message such as a flag indicating whether the coded video unit is a re-sampled one. In an embodiment, the information may include at least one re-sampling ratio. In one example, whether a video unit is a re-sampled one may be derived from the re-sampling ratio. For example, a re-sampling ratio that is greater than 1 indicates the video is down-sampled. In one example, the re-sampling ratio may be different for width and height. In an embodiment, the re-sampling ratios for different video units (e.g., sequence/picture/slice/tile/brick/subpicture/CTU/CTU row/one or multiple coding units (CUs) or CTUs/CTBs, or any region covering more than one sample/pixel) level may be signaled individually. For example, the re-sampling ratios for different video units may be signaled in different syntax elements of a re-sampling SEI message 223, or in different re-sampling SEI messages 223.

Example 5

The information regarding re-sampling included in the re-sampling SEI message 223 may further include the re-sampling methods. In an embodiment, the re-sampling methods may be signaled as a syntax element in the re-sampling SEI message 223, with different values representing different methods. In one example, a value of the re-sampling methods, e.g., 0, may indicate that the down-sampling method is the DCTIF. In one example, a value of the re-sampling methods, e.g., 1, may indicate that the down-sampling method is the bilinear filter. In one example, a value of the re-sampling methods, e.g., 2, may indicate that the down-sampling method is the bicubic filter. In one example, a value of the re-sampling methods, e.g., 3, may indicate that the down-sampling method is the learning-based method. In one example, the learning-based method may be the CNN-based down-sampling method. In one example, the learning-based method may be the machine learning-based down-sampling method. In one example, a value of the re-sampling methods, e.g., 4, may indicate that the down-sampling method is not specified in the existing video coding standards.

In an embodiment, the re-sampling methods for luma components may be different from chroma components. In an embodiment, the re-sampling methods for different types of slices may be signaled individually, for example, in the re-sampling SEI message 223. The different types of slices may be intra-prediction (I) type slices, unidirectional inter-prediction (P) type slices, or bidirectional inter-prediction (B) type slices. In an embodiment, the re-sampling methods for these different types of slices may be signaled individually, for example, in separate syntax elements of the SEI message 223.

In an embodiment, the re-sampling methods for different temporal layers may be signaled individually, for example, in the re-sampling SEI message 223. For example, a lowest temporal layer may contain the least number of frames per second, and enhancement layers contain additional frames per second. A decoder may select the number of temporals based on the corresponding frames per second. In an embodiment, the re-sampling methods for these different temporal layers may be signaled individually, for example, in separate syntax elements of the SEI message 223. In an embodiment, indications regarding several (or multiple) re-sampling methods that are utilized together to achieve a specified re-sampling ratio may be signaled, for example, in the re-sampling SEI message 223. In one example, two re-sampling methods may be signaled in the re-sampling SEI message 223, in which the first re-sampling method is learning-based and the second re-sampling method is hand-crafted (e.g., bilinear, bicubic, DCTIF, etc.).

Example 6

The re-sampling SEI message 223 may have a syntax as shown in Table 3 below:

TABLE 3

| | |
|---|---|
| resampling( payloadSize ) { | |
|    resampling_flag | u(1) |
|    if(resampling_flag) { | |
|       downsampling_ratio | u(2) |
|       downsampling_methods_for_luma | u(3) |
|       use_alternative_filter_for_chroma | u(1) |
|       if( use_alternative_filter_for_chroma ) { | |
|          downsampling_methods_for_chroma | u(3) |
|       } | |
|    } | |
| } | |

The semantics in the re-sampling SEI message 223 syntax shown in Table 3 may be as follows. The resampling_flag being equal to 1 indicates the compressed video is down-sampled. In contrast, the resampling_flag being equal to 0 indicates the video is compressed at its original resolution. The downsampling_ratio may specify the down-sampling ratio of the compressed video. The value of downsampling_ratio may be $2^{downsampling\_ratio+1}$. The down-sampling_methods_for_luma may specify the down-sampling methods for luma components in the video unit. The type of down-sampling methods is specified in Table 2 above. The use_alternative_filter_for_chroma may be a flag that, when equal to 1, may indicate different down-sampling methods are applied for luma and chroma components, respectively, or vice versa. The use_alternative_filter_for_chroma, when equal to 0, may indicate the down-sampling method for luma component is the same as chroma components, or vice versa. The downsampling_methods_for_chroma may specify the down-sampling methods for chroma components. The type of down-sampling methods is specified in Table 2 above.

Figure 4:
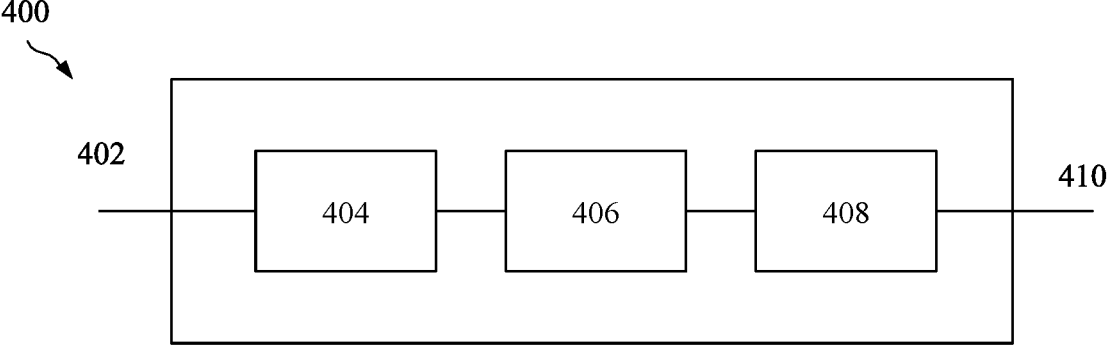
FIG. 4 is a block diagram showing an example video processing system.

FIG. 4 is a block diagram showing an example video processing system 400 in which various embodiments disclosed herein may be implemented. Various implementations may include some or all of the components of the system 400. The system 400 may include input 402 for receiving video content. The video content may be received in a raw or uncompressed format, e.g., 8- or 10-bit multi-component pixel values, or may be in a compressed or encoded format. The input 402 may represent a network interface, a peripheral bus interface, or a storage interface. Examples of network interface include wired interfaces such as Ethernet, passive optical network (PON), etc., and wireless interfaces such as Wi-Fi or cellular interfaces.

The system 400 may include a coding component 404 that may implement the various coding or encoding methods described in the present disclosure. The coding component 404 may reduce the average bitrate of video from the input 402 to the output of the coding component 404 to produce a coded representation of the video. The coding techniques are therefore sometimes called video compression or video transcoding techniques. The output of the coding component 404 may be either stored, or transmitted via a communication connected, as represented by the component 406. The stored or communicated bitstream (or coded) representation of the video received at the input 402 may be used by a component 408 for generating pixel values or displayable video that is sent to a display interface 410. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or DisplayPort, and so on. Examples of storage interfaces include serial advanced technology attachment (SATA), peripheral component interconnect (PCI), integrated drive electronics (IDE) interface, and the like. The embodiments described in the present disclosure may be embodied in various electronic devices such as mobile phones, laptops, smartphones or other devices that are capable of performing digital data processing and/or video display.

Figure 5:
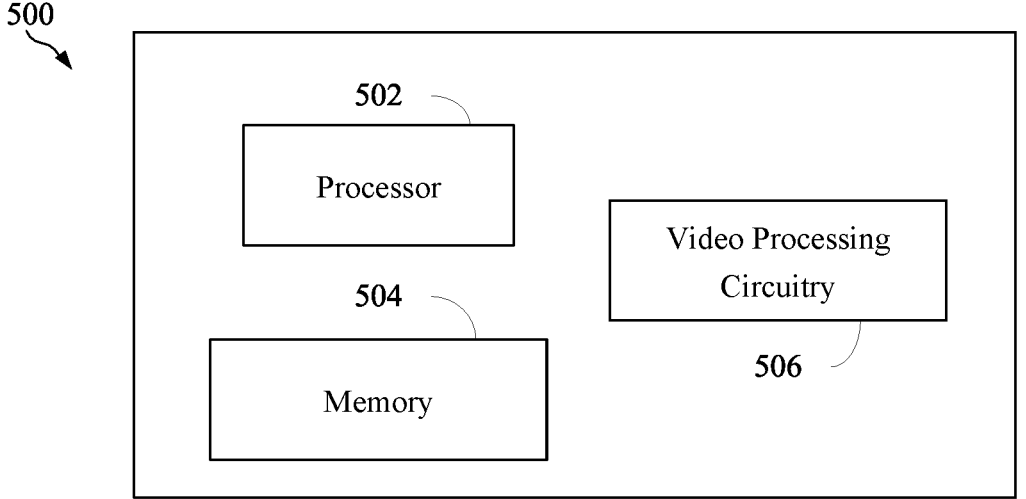
FIG. 5 is a block diagram of an example video processing apparatus.

FIG. 5 is a block diagram of an example video processing apparatus 500. The apparatus 500 may be used to implement one or more of the methods described herein. The apparatus 500 may be embodied in a smartphone, tablet, computer, Internet of Things (IOT) receiver, and so on. The apparatus 500 may include one or more processors 502, one or more memories 504 and video processing circuitry 506. The processor(s) 502 may be configured to implement one or more methods described in the present disclosure. The memory (memories) 504 may be used for storing data and code used for implementing the methods and embodiments described herein. The video processing circuitry 506 may be used to implement, in hardware circuitry, some embodiments described in the present disclosure. In some embodiments, the video processing circuitry 506 may be at least partly included in the processor 502, e.g., a graphics co-processor.

Figure 6:
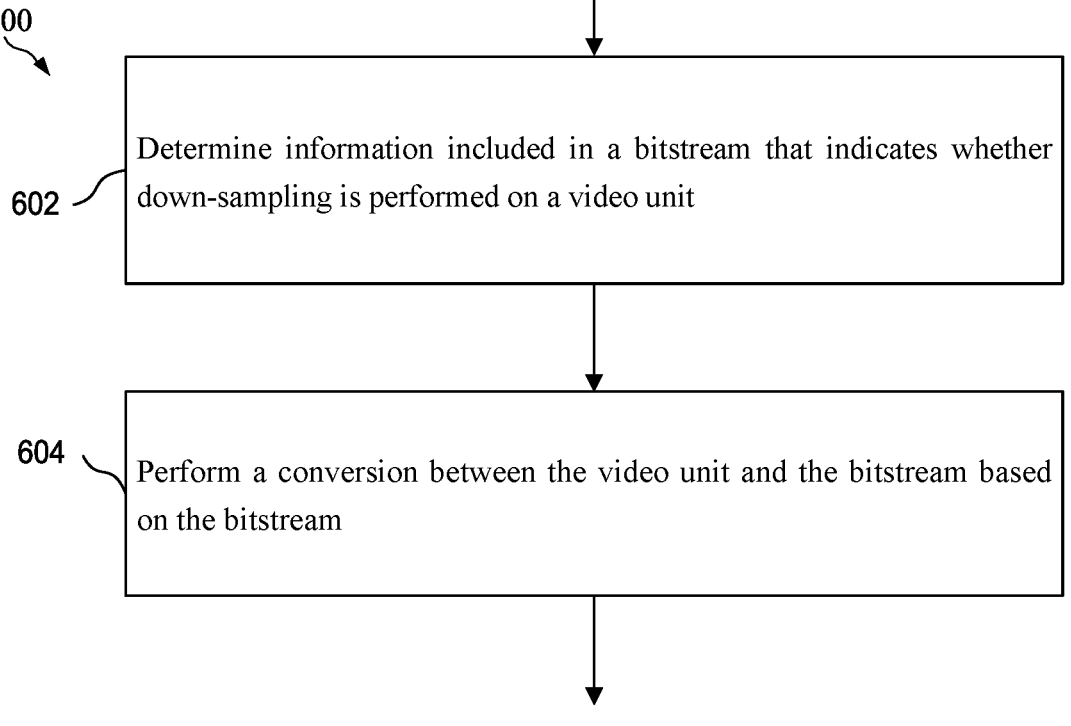
FIG. 6 is a flowchart for an example method of video processing.

FIG. 6 is a flowchart for an example method 600 of video processing. The method 600 includes a determination of information included in a bitstream that indicates whether down-sampling is performed on a video unit at step 602. The information may indicate whether down-sampling is performed on the video unit. At step 604, a conversion is performed between the video unit and the bitstream based on the bitstream. For example, step 602 may also include determining a down-sampling ratio and one or more down-sampling methods applied to the video unit when down-sampling is performed on the video unit. Step 604 can then include performing video encoding at an encoder or video decoding at a decoder, for example by employing the results determined by the equations and/or algorithms. Step 604 may also include up-sampling the video unit based on the determination of whether down-sampling is performed on the video unit, the down-sampling ratio, and the one or more down-sampling methods.

In an embodiment, the information indicates a method of down-sampling. In an embodiment, the information is carried in a SEI message associated with the video unit in the bitstream. In an embodiment, the information in the bitstream excludes data regarding whether to perform down-sampling on the video unit, excludes data regarding a method of down-sampling, and excludes data regarding a re-sampling ratio. In an embodiment, the information is associated with a sequence, and wherein the SEI message comprising the information is positioned in the bitstream before a SPS or a sequence header of the sequence. In an embodiment, the information is associated with a picture, and wherein the SEI message comprising the information is positioned in the bitstream before a picture parameter set or a picture header of the picture. In an embodiment, the information is associated with a slice, and wherein the SEI message comprising the information is positioned in the bitstream before a slice header of the slice. In an embodiment, the information is associated with a sequence, and wherein the SEI message comprising the information is positioned in the bitstream after a SPS or a sequence header of the sequence. In an embodiment, the information is associated with a picture, and wherein the SEI message comprising the information is positioned in the bitstream after a picture parameter set or a picture header of the picture. In an embodiment, the information is associated with a slice, and wherein the SEI message comprising the information is positioned in the bitstream after a slice header of the slice. In an embodiment, the information in the bitstream comprises a flag indicating whether down-sampling is performed on the video unit. In an embodiment, the information in the bitstream comprises a re-sampling ratio indicating a ratio by which the video unit is down-sampled, and wherein down-sampling is performed on the video unit when the re-sampling ratio is greater than a threshold value. In an embodiment, the information in the bitstream comprises a syntax element indicating one or more methods of down-sampling performed on the video unit. In an embodiment, the syntax element carries at least one of a value indicating that a discrete cosine transform-based interpolation filter is used to perform down-sampling on the video unit, a value indicating that a bilinear filter is used to perform down-sampling on the video unit, or a value indicating that a bicubic filter is used to perform down-sampling on the video unit. In an embodiment, the syntax element carries a value indicating that a learning based down-sampling method is used to perform down-sampling on the video unit. In an embodiment, the learning based down-sampling method comprises at least one of a CNN-based down-sampling method or a machine learning based down-sampling method. In an embodiment, the information in the bitstream comprises a flag indicating whether different down-sampling methods are applied for luma components and chroma components of the video unit. In an embodiment, the information in the bitstream indicates at least one of a first down-sampling method performed on luma components of the video unit and a second down-sampling method performed on chroma components of the video unit. In an embodiment, a first plurality of down-sampling methods for different types are slices are indicated individually in the bitstream in different syntax elements, and wherein a second plurality of down-sampling methods for different temporal layers are indicated individually in the bitstream in different syntax elements. In an embodiment, the information in the bitstream indicates a first method of down-sampling performed on the video unit and a second method of down-sampling performed on the video unit. In an embodiment, the conversion includes encoding the video unit into the bitstream. In an embodiment, the conversion includes encoding the video unit into the bitstream.

It should be noted that the method 600 can be implemented in an apparatus for processing video data comprising a processor and a non-transitory memory with instructions thereon, such as video encoder 800, video decoder 900, and/or encoder 1000. In such a case, the instructions upon execution by the processor, cause the processor to perform the method 600. Further, the method 600 can be performed by a non-transitory computer readable medium comprising a computer program product for use by a video coding device. The computer program product comprises computer executable instructions stored on the non-transitory computer readable medium such that when executed by a processor cause the video coding device to perform the method 600.

Figure 7:
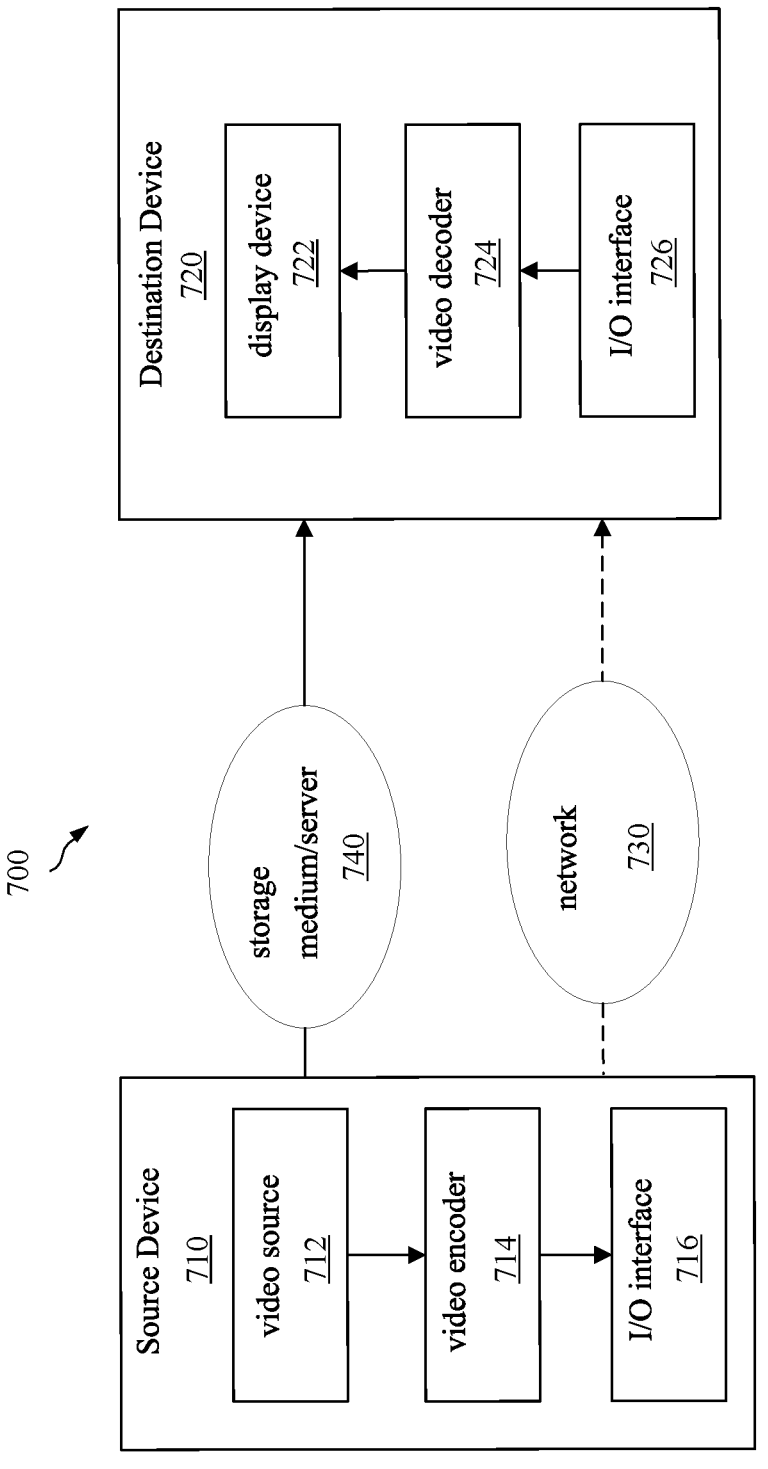
FIG. 7 is a block diagram that illustrates an example video coding system.

FIG. 7 is a block diagram that illustrates an example video coding system 700 that may utilize the embodiments of this disclosure. As shown in FIG. 7, video coding system 700 may include a source device 710 and a destination device 720. Source device 710 generates encoded video data which may be referred to as a video encoding device. Destination device 720 may decode the encoded video data generated by source device 710 which may be referred to as a video decoding device.

Source device 710 may include a video source 712, a video encoder 714, and an input/output (I/O) interface 716. Video source 712 may include a source such as a video capture device, an interface to receive video data from a video content provider, and/or a computer graphics system for generating video data, or a combination of such sources. The video data may comprise one or more pictures. Video encoder 714 encodes the video data from video source 712 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 716 may include a modulator/demodulator (modem) and/or a transmitter. The encoded video data may be transmitted directly to destination device 720 via I/O interface 716 through network 730. The encoded video data may also be stored onto a storage medium/server 740 for access by destination device 720.

Destination device 720 may include an I/O interface 726, a video decoder 724, and a display device 722. I/O interface 726 may include a receiver and/or a modem. I/O interface 726 may acquire encoded video data from the source device 710 or the storage medium/server 740. Video decoder 724 may decode the encoded video data. Display device 722 may display the decoded video data to a user. Display device 722 may be integrated with the destination device 720, or may be external to destination device 720, which can be configured to interface with an external display device.

Video encoder 714 and video decoder 724 may operate according to a video compression standard, such as the HEVC standard, VVC standard, and other current and/or further standards.

FIG. 8 is a block diagram illustrating an example of video encoder 800, which may be video encoder 714 in the system 700 illustrated in FIG. 7. Video encoder 800 may be configured to perform any or all of the embodiments of this disclosure. In the example of FIG. 8, video encoder 800 includes a plurality of functional components. The embodiments described in this disclosure may be shared among the various components of video encoder 800. In some examples, a processor may be configured to perform any or all of the embodiments described in this disclosure.

The functional components of video encoder 800 may include a partition unit 801; a prediction unit 802, which may include a mode selection unit 803, a motion estimation unit 804, a motion compensation unit 805, and an intra prediction unit 806; a residual generation unit 807; a transform processing unit 808; a quantization unit 809; an inverse quantization unit 810; an inverse transform unit 811; a reconstruction unit 812; a buffer 813; and an entropy encoding unit 814.

In other examples, video encoder 800 may include more, fewer, or different functional components. In an example, prediction unit 802 may include an intra block copy (IBC) unit. The IBC unit may perform prediction in an IBC mode in which at least one reference picture is a picture where the current video block is located.

Furthermore, some components, such as motion estimation unit 804 and motion compensation unit 805 may be highly integrated, but are represented in the example of FIG. 8 separately for purposes of explanation.

Partition unit 801 may partition a picture into one or more video blocks. Video encoder 800 and video decoder 900 may support various video block sizes.

Mode selection unit 803 may select one of the coding modes, intra or inter, e.g., based on error results, and provide the resulting intra or inter coded block to a residual generation unit 807 to generate residual block data and to a reconstruction unit 812 to reconstruct the encoded block for use as a reference picture. In some examples, mode selection unit 803 may select a combination of intra and inter prediction (CIIP) mode in which the prediction is based on an inter prediction signal and an intra prediction signal. Mode selection unit 803 may also select a resolution for a motion vector (e.g., a sub-pixel or integer pixel precision) for the block in the case of inter prediction.

To perform inter prediction on a current video block, motion estimation unit 804 may generate motion information for the current video block by comparing one or more reference frames from buffer 813 to the current video block. Motion compensation unit 805 may determine a predicted video block for the current video block based on the motion information and decoded samples of pictures from buffer 813 other than the picture associated with the current video block.

Motion estimation unit 804 and motion compensation unit 805 may perform different operations for a current video block, for example, depending on whether the current video block is in an I slice, a P slice, or a B slice.

In some examples, motion estimation unit 804 may perform uni-directional prediction for the current video block, and motion estimation unit 804 may search reference pictures of list 0 or list 1 for a reference video block for the current video block. Motion estimation unit 804 may then generate a reference index that indicates the reference picture in list 0 or list 1 that contains the reference video block and a motion vector that indicates a spatial displacement between the current video block and the reference video block. Motion estimation unit 804 may output the reference index, a prediction direction indicator, and the motion vector as the motion information of the current video block. Motion compensation unit 805 may generate the predicted video block of the current block based on the reference video block indicated by the motion information of the current video block.

In other examples, motion estimation unit 804 may perform bi-directional prediction for the current video block, motion estimation unit 804 may search the reference pictures in list 0 for a reference video block for the current video block and may also search the reference pictures in list 1 for another reference video block for the current video block. Motion estimation unit 804 may then generate reference indexes that indicate the reference pictures in list 0 and list 1 containing the reference video blocks and motion vectors that indicate spatial displacements between the reference video blocks and the current video block. Motion estimation unit 804 may output the reference indexes and the motion vectors of the current video block as the motion information of the current video block. Motion compensation unit 805 may generate the predicted video block of the current video block based on the reference video blocks indicated by the motion information of the current video block.

In some examples, motion estimation unit 804 may output a full set of motion information for decoding processing of a decoder. In some examples, motion estimation unit 804 may not output a full set of motion information for the current video. Rather, motion estimation unit 804 may signal the motion information of the current video block with reference to the motion information of another video block. For example, motion estimation unit 804 may determine that the motion information of the current video block is sufficiently similar to the motion information of a neighboring video block.

In one example, motion estimation unit 804 may indicate, in a syntax structure associated with the current video block, a value that indicates to the video decoder 900 that the current video block has the same motion information as another video block.

In another example, motion estimation unit 804 may identify, in a syntax structure associated with the current video block, another video block and a motion vector difference (MVD). The motion vector difference indicates a difference between the motion vector of the current video block and the motion vector of the indicated video block. The video decoder 900 may use the motion vector of the indicated video block and the motion vector difference to determine the motion vector of the current video block.

As discussed above, video encoder 800 may predictively signal the motion vector. Two examples of predictive signaling techniques that may be implemented by video encoder 800 include advanced motion vector prediction (AMVP) and merge mode signaling.

Intra prediction unit 806 may perform intra prediction on the current video block. When intra prediction unit 806 performs intra prediction on the current video block, intra prediction unit 806 may generate prediction data for the current video block based on decoded samples of other video blocks in the same picture. The prediction data for the current video block may include a predicted video block and various syntax elements.

Residual generation unit 807 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 807 may not perform the subtracting operation.

Transform processing unit 808 may generate one or more transform coefficient video blocks for the current video block by applying one or more transforms to a residual video block associated with the current video block.

After transform processing unit 808 generates a transform coefficient video block associated with the current video block, quantization unit 809 may quantize the transform coefficient video block associated with the current video block based on one or more quantization parameter (QP) values associated with the current video block.

Inverse quantization unit 810 and inverse transform unit 811 may apply inverse quantization and inverse transforms to the transform coefficient video block, respectively, to reconstruct a residual video block from the transform coefficient video block. Reconstruction unit 812 may add the reconstructed residual video block to corresponding samples from one or more predicted video blocks generated by the prediction unit 802 to produce a reconstructed video block associated with the current block for storage in the buffer 813.

After reconstruction unit 812 reconstructs the video block, the loop filtering operation may be performed to reduce video blocking artifacts in the video block.

Entropy encoding unit 814 may receive data from other functional components of the video encoder 800. When entropy encoding unit 814 receives the data, entropy encoding unit 814 may perform one or more entropy encoding operations to generate entropy encoded data and output a bitstream that includes the entropy encoded data.

FIG. 9 is a block diagram illustrating an example of video decoder 900 which may be video decoder 724 in the system 700 illustrated in FIG. 7.

The video decoder 900 may be configured to perform any or all of the embodiments of this disclosure. In the example of FIG. 9, the video decoder 900 includes a plurality of functional components. The embodiments described in this disclosure may be shared among the various components of the video decoder 900. In some examples, a processor may be configured to perform any or all of the embodiments described in this disclosure.

In the example of FIG. 9, video decoder 900 includes an entropy decoding unit 901, a motion compensation unit 902, an intra prediction unit 903, an inverse quantization unit 904, an inverse transformation unit 905, a reconstruction unit 906, and a buffer 907. Video decoder 900 may, in some examples, perform a decoding pass generally reciprocal to the encoding pass described with respect to video encoder 800 (FIG. 8).

Entropy decoding unit 901 may retrieve an encoded bitstream. The encoded bitstream may include entropy coded video data (e.g., encoded blocks of video data). Entropy decoding unit 901 may decode the entropy coded video data, and from the entropy decoded video data, motion compensation unit 902 may determine motion information including motion vectors, motion vector precision, reference picture list indexes, and other motion information. Motion compensation unit 902 may, for example, determine such information by performing the AMVP and merge mode.

Motion compensation unit 902 may produce motion compensated blocks, possibly performing interpolation based on interpolation filters. Identifiers for interpolation filters to be used with sub-pixel precision may be included in the syntax elements.

Motion compensation unit 902 may use interpolation filters as used by video encoder 800 during encoding of the video block to calculate interpolated values for sub-integer pixels of a reference block. Motion compensation unit 902 may determine the interpolation filters used by video encoder 800 according to received syntax information and use the interpolation filters to produce predictive blocks.

Motion compensation unit 902 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 903 may use intra prediction modes for example received in the bitstream to form a prediction block from spatially adjacent blocks. Inverse quantization unit 904 inverse quantizes, i.e., de-quantizes, the quantized video block coefficients provided in the bitstream and decoded by entropy decoding unit 901. Inverse transform unit 905 applies an inverse transform.

Reconstruction unit 906 may sum the residual blocks with the corresponding prediction blocks generated by motion compensation unit 902 or intra prediction unit 903 to form decoded blocks. If desired, a deblocking filter may also be applied to filter the decoded blocks in order to remove blockiness artifacts. The decoded video blocks are then stored in buffer 907, which provides reference blocks for subsequent motion compensation/intra prediction and also produces decoded video for presentation on a display device.

FIG. 10 is a schematic diagram of an example encoder 1000. The encoder 1000 is suitable for implementing the techniques of VVC. The encoder 1000 includes three in-loop filters, namely a deblocking filter (DF) 1002, a sample adaptive offset (SAO) 1004, and an adaptive loop filter (ALF) 1006. Unlike the DF 1002, which uses predefined filters, the SAO 1004 and the ALF 1006 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 1006 is located at the last processing stage of each picture and can be regarded as a tool trying to catch and fix artifacts created by the previous stages.

The encoder 1000 further includes an intra prediction component 1008 and a motion estimation/compensation (ME/MC) component 1010 configured to receive input video. The intra prediction component 1008 is configured to perform intra prediction, while the ME/MC component 1010 is configured to utilize reference pictures obtained from a reference picture buffer 1012 to perform inter prediction. Residual blocks from inter prediction or intra prediction are fed into a transform (T) component 1014 and a quantization (Q) component 1016 to generate quantized residual transform coefficients, which are fed into an entropy coding component 1018. The entropy coding component 1018 entropy codes the prediction results and the quantized transform coefficients and transmits the same toward a video decoder (not shown). Quantization components output from the quantization component 1016 may be fed into an inverse quantization (IQ) components 1020, an inverse transform component 1022, and a reconstruction (REC) component 1024. The REC component 1024 is able to output images to the DF 1002, the SAO 1004, and the ALF 1006 for filtering prior to those images being stored in the reference picture buffer 1012.

A listing of solutions preferred by some embodiments is provided next.

The following solutions show examples of embodiments discussed in the previous section (e.g., item 1).

1. A method of media data processing (e.g., method 700 depicted in FIG. 3), comprising: performing (702) a conversion between a video comprising a first video unit having a first resolution and a bitstream of the video according to a rule, wherein the rule specifies whether or how the first video unit is determined using a resampling process from a second video unit having a second resolution that is different from the first resolution.

2. The method of solution 1, wherein the rule specifies that the resampling process is indicated in a syntax structure.

3. The method of solution 1, wherein the rule specifies whether or how the resampling process is used is derived at a decoder-side.

4. The method of any of solutions 1-3, wherein the first resolution is different from the second resolution such that a dimension of the first video unit is less than a dimension of the second video unit.

5. The method of any of solutions 1-4, wherein the first video unit and the second video unit comprise a sequence or a picture or a sub-picture or a slice.

6. The method of solution 2, wherein the rule specifies that the resampling process is indicated in a sequence parameter set or a sequence header or a picture parameter set or a picture header or a slice header or an adaptation parameter set.

7. The method of solution 2, wherein the rule specifies that the resampling process is indicated in a supplemental enhancement information message.

8. The method of any of solutions 1-7, wherein the rule specifies that the resampling process is indicated using at least one re-sampling ratio.

The following solutions show examples of embodiments discussed in the previous section (e.g., item 1).

9. The method of any of solutions 1-8, wherein the rule specifies that the resampling process is indicated using a syntax element having a value indicative of the resampling process.

10. The method of solution 9, wherein the value indicates that the resampling process uses a discrete cosine transform-based interpolation filter (DCTIF).

11. The method of solution 9, wherein the value indicates that the resampling process uses a bilinear filter.

12. The method of any of solutions 1-11, wherein the rule specifies that the resampling process is applied differently for luma and chroma components of the video.

13. The method of any of solutions 1-11, wherein the rule specifies that the resampling process is applied differently for different temporal layers of the video.

14. The method of any of solutions 1-13, wherein the resampling process comprises multiple stages of resampling.

15. The method of any of solutions 1-13, wherein the conversion includes generating the video from the bitstream.

16. A video decoding apparatus comprising a processor configured to implement a method recited in one or more of solutions 1 to 15.

17. A video encoding apparatus comprising a processor configured to implement a method recited in one or more of solutions 1 to 15.

18. A computer program product having computer code stored thereon, the code, when executed by a processor, causes the processor to implement a method recited in any of solutions 1 to 15.

19. A method of video processing comprising generating a bitstream according to a method recited in any one or more of solutions 1-15, and storing the bitstream on a computer readable medium.

20. A method, an apparatus or a system described in the present disclosure.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field-programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and Digital versatile disc-read only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of the present disclosure. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of processing video data, comprising:
determining, for a conversion between a current video unit of a video and a bitstream of the video, whether information indicating whether down-sampling is performed on the current video unit is included in the bitstream; and
performing the conversion based on the determining,
wherein the information indicates at least one of a method of down-sampling or a re-sampling ratio,
wherein a part of the information is derived directly without signaling, and
wherein the information is included in a supplemental enhancement information (SEI) message associated with the current video unit in the bitstream.

2. The method of claim 1, wherein the information in the bitstream excludes at least one of: data regarding whether to perform down-sampling on the current video unit, data regarding the method of down-sampling, or data regarding the re-sampling ratio.

3. The method of claim 1, wherein when the information is associated with a sequence, the SEI message comprising the information is before a sequence parameter set (SPS) or a sequence header of the sequence in the bitstream;
when the information is associated with a picture, the SEI message comprising the information is before a picture parameter set (PPS) or a picture header of the picture in the bitstream; and
when the information is associated with a slice, the SEI message comprising the information is before a slice header of the slice in the bitstream.

4. The method of claim 1, wherein when the information is associated with a sequence, the SEI message comprising the information is after a sequence parameter set (SPS) or a sequence header of the sequence in the bitstream;

when the information is associated with a picture, the SEI message comprising the information is after a picture parameter set (PPS) or a picture header of the picture in the bitstream; and when the information is associated with a slice, the SEI message comprising the information is after a slice header of the slice in the bitstream.

5. The method of claim 1, wherein the information in the bitstream comprises a flag indicating whether down-sampling is performed on the current video unit.

6. The method of claim 1, wherein the information in the bitstream comprises a re-sampling ratio indicating a ratio by which the current video unit is down-sampled, and wherein down-sampling is performed on the current video unit when the re-sampling ratio is greater than a threshold value.

7. The method of claim 6, wherein the re-sampling ratio is determined based on at least one of a width or a height for the current video unit, and wherein re-sampling ratios for different video unit levels are signalled individually.

8. The method of claim 1, wherein the information in the bitstream comprises a syntax element indicating a method of down-sampling performed on the current video unit.

9. The method of claim 8, wherein a value of the syntax element equal to 0 indicates that a discrete cosine transform-based interpolation filter is used to perform down-sampling on the current video unit, the value of the syntax element equal to 1 indicates that a bilinear filter is used to perform down-sampling on the current video unit, and the value of the syntax element equal to 2 indicates that a bicubic filter is used to perform down-sampling on the current video unit.

10. The method of claim 8, wherein a value of the syntax element equal to 3 indicates that a learning-based down-sampling method is used to perform down-sampling on the current video unit, and the value of the syntax element equal to 4 indicates that the method of down-sampling is not specified, and wherein the learning-based down-sampling method comprises at least one of a convolutional neural network (CNN)-based down-sampling method or a machine learning-based down-sampling method.

11. The method of claim 1, wherein the information in the bitstream comprises a flag indicating whether different down-sampling methods are applied for luma components and chroma components of the current video unit.

12. The method of claim 1, wherein a first plurality of down-sampling methods for different types of slices are indicated individually in the bitstream, and wherein a second plurality of down-sampling methods for different temporal layers are indicated individually in the bitstream.

13. The method of claim 1, wherein the information in the bitstream indicates a first method of down-sampling performed on the current video unit and a second method of down-sampling performed on the current video unit, wherein the first method of down-sampling is a learning-based down-sampling method, and the second method of down-sampling uses bilinear filter, bicubic filter, or a discrete cosine transform-based interpolation filter.

14. The method of claim 1, wherein the current video unit is a sequence, a picture, a sub-picture, or a slice, and wherein the information is signaled for the current video unit in a sequence parameter set (SPS), a sequence header, a picture parameter set (PPS), a picture header, a slice header, or an adaptation parameter set (APS).

15. The method of claim 1, wherein the information further indicates whether or how a first video unit having a first resolution is determined using a re-sampling process from a second video unit having a second resolution that is different from the first resolution, and wherein at least one component of the first resolution is lower than at least one component of the second resolution.

16. The method of claim 1, wherein the conversion includes encoding the current video unit into the bitstream.

17. The method of claim 1, wherein the conversion includes decoding the current video unit from the bitstream.

18. An apparatus for processing video data comprising a processor and a non-transitory memory with instructions thereon, wherein the instructions upon execution by the processor, cause the processor to:

determine, for a conversion between a current video unit of a video and a bitstream of the video, whether information indicating whether down-sampling is performed on the current video unit is included in the bitstream; and perform the conversion based on the determining, wherein the information indicates at least one of a method of down-sampling or a re-sampling ratio, wherein a part of the information is derived directly without signaling, and wherein the information is included in a supplemental enhancement information (SEI) message associated with the current video unit in the bitstream.

19. A non-transitory computer-readable recording medium storing a bitstream of a video which is generated by a method performed by a video processing apparatus, wherein the method comprises:

determining, for a current video unit of the video, whether information indicating whether down-sampling is performed on the current video unit is included in the bitstream; and generating the bitstream based on the determining, wherein the information indicates at least one of a method of down-sampling or a re-sampling ratio, wherein a part of the information is derived directly without signaling, and wherein the information is included in a supplemental enhancement information (SEI) message associated with the current video unit in the bitstream.

20. The apparatus of claim 18, wherein the information in the bitstream comprises a flag indicating whether down-sampling is performed on the current video unit.

* * * * *